Patented July 17, 1951

2,561,313

UNITED STATES PATENT OFFICE 2,561,313

UNSATURATED OIL-SOLUBLE COPOLYMERS

Theodore P. Malinowski, Springfield, Mass., assignor to Monsanto Chemical Company, St. Louis, Mo., a corporation of Delaware No Drawing. Application December 10, 1948, Serial No. 64,712

12 Claims. (Cl. 260—23)

This invention relates to oil-soluble copolymers of alpha-methyl styrene and maleic anhydride.

It is known to polymerize alpha-methyl styrene, but the polymers which have been produced are not suitable for some uses. For example, even those polymers which are soluble in drying and semi-drying oils are non-reactive therewith, and for this reason their use in surface coating compositions has been greatly curtailed. Thus, if an oil-soluble alpha-methyl styrene polymer could be provided which is also reactive with drying and semi-drying oils, an entirely new field of application would be opened up.

It is an object of this invention to provide new oil-soluble resinous materials. A particular object of this invention is to provide oil-soluble, oil-reactive alpha-methyl styrene polymers.

These and other objects are accomplished according to this invention by copolymerizing a mixture of alpha-methyl styrene and maleic anhydride in the presence of fuller's earth, the molar ratio of alpha-methyl styrene to maleic anhydride being in the range 2:1–8:1.

The following examples are illustrative of the present invention, but are not to be considered as limitative thereof. Where parts are mentioned, they are parts by weight.

Example I 236 parts of alpha-methyl styrene are admixed with 49 parts of maleic anhydride and the mixture heated at 40° C. to effect solution. Fuller's earth is added in ½ part increments and the exothermic reaction is controlled at 60° C. by external cooling. Twelve of such increments are added over a two hour period. Therafter, 200 parts of toluene are added and the mixture heated up to 150° C. over a ten-minute period.

Filtration of one-half of the above product followed by removal of the toluene by vacuum distillation leaves a resinous residue which is soluble in drying and semi-drying oils. On heating mixtures of the resinous product with such oils, e. g., cottonseed or tung oil, a reaction occurs and the products form excellent films.

37 parts of hydroxy-dihydro-dicyclopentadiene are added to the rest of the toluene solution and the heating continued at 170° C. for one hour. The reaction product is filtered and then cooled to room temperature. Thereupon a white, resinous precipitate separates. A mixture of 100 parts of this precipitate with 150 parts of dehydrated castor oil is heated for thirty minutes at 280° C. Films are cast from this reaction product after the addition of sufficient cobalt naphthenate drier to provide 0.01% cobalt. After heating for thirty minutes at 135° C., the films are dry and tough.

Example II

A mixture of 49 parts of maleic anhydride, 245 parts of alpha-methyl styrene and 100 parts of benzene is prepared. After the addition of 2 parts of fuller's earth, an exothermic reaction sets in and the temperature is maintained at 48° C. by external cooling. Two further additions of fuller's earth in like amount are made. After a total reaction period of 85 minutes, the mixture is heated to reflux temperature (107° C.) and allowed to reflux for thirty minutes. The reaction product is filtered and vacuum distilled up to a maximum pot temperature of 258° C. and a maximum distillate temperature of 200° C. at an absolute pressure corresponding to 9 mm. of mercury. The residue is a slightly hazy, hard, resinous material and is obtained in a 59% yield.

The resinous product is found to have an equivalent weight of 484 based on carboxyl group content. Cryoscopic molecular weight determinations in benzene show a value of 449. A benzene solution of the resin absorbs bromine readily.

A mixture of 45 parts of the above resin is mixed with 54 parts of tung oil and 12 parts of bodied linseed oil. The temperature of the mixture of oil and resin is raised to 280° C. in 15 minutes, and 40 minutes additional heating at this temperature are required to body the varnish. Both air dried films and baked films prepared from this varnish after the addition of driers, e. g., sufficient cobalt naphthenate drier to provide 0.01% cobalt, are found to have valuable characteristics. For example, such films are found to have unusual resistance to solvents such as xylol.

The resinous product of this example is mixed with sufficient hydroxy-dihydro-dicyclopentadiene to form the half ester of the carboxylic groups and the mixture heated until a compatible product results, about 15 minutes at 200—280° C. being required. A varnish is prepared from this modified resin in the same manner as set forth above for the unmodified resin. Films of this varnish are prepared and baked at 135° C. for 30 minutes. More rapid drying results then when unmodified resin is used.

A sufficient amount of a mixture of 100 parts of ethyl alcohol and 100 parts of benzene are mixed with a portion of the resinous reaction product of alpha-methyl styrene and maleic anhydride described above to form the half-ethyl ester. The resulting mixture is heated at 110° C. to dryness. Molecular weight determinations of the product show that the product is a monoethyl ester. The softening point of this product is about 60° C., in contrast to 50° C. for the unmodified resin.

*Example III*

590 parts of alpha-methyl styrene and 125 parts of maleic anhydride are dissolved in 250 parts of benzene at 24° C. 5 parts of activated fuller's earth are added and the temperature rises to about 70° C. in about 17 minutes due to an exothermic reaction. The temperature is then lowered by external cooling to 52° C. in 30 minutes. Thereafter an additional 5 parts of activated fuller's earth are added, but no exothermic reaction results. The reaction mixture is then heated at its reflux temperature and maintained at this temperature for 90 minutes. The product is filtered and subjected to vacuum distillation at a maximum pot temperature of 258° C., a maximum distillate temperature of 210° C. at an absolute pressure corresponding to 12 mm. of mercury. The residue is a hard, resinous mass and is obtained in a 50% yield.

The resin is found to have a molecular weight of about 400 based on cryoscopic methods and an equivalent weight of 635 based on carboxyl group content.

54 parts of tung oil, 12 parts of bodied linseed oil and 6.8 parts of glycerine are heated at 180–200° C. together with 0.1 part of zinc oxide for 1 hour. 45 parts of the resin of Example III are added and the mixture heated at 280° C. for 20 minutes to form a bodied compatible product. Films formed from this product after either air drying or baking at 135° C. exhibit resistance to xylol.

*Example IV*

590 parts of alpha-methyl styrene and 125 parts of maleic anhydride are dissolved in 250 parts of benzene at 25° C. The solution is cooled to 13° C. and thereafter 5 parts of activated fuller's earth are added. Despite external cooling, the temperature of the reaction mixture rises to 22° C. over a period of 30 minutes. An additional 5 parts of the fuller's earth are added and the temperature allowed to rise to 40° C. over a period of 25 minutes and maintained at this temperature for 60 minutes, whereupon the temperature is allowed to fall to about 25° C. over a period of 1½ hours. The further addition of 13 parts of the fuller's earth causes only a 2° C. rise in temperature. The mixture is then heated at 46° C. for 2½ hours. The product is cooled to room temperature, filtered and the filtrate cooled in an ice bath. A small amount of unreacted maleic anhydride precipitates and is filtered off. The remaining filtrate is subjected to vacuum distillation up to a pot temperature of 250° C., and a distillate temperature of 166° C., and at an absolute pressure corresponding to 14 mm. of mercury. The residue which is obtained in a 47% yield is a hard resinous mass which is oil soluble and reacts with unsaturated vegetable oils to give material suitable for film-forming compositions.

*Example V*

295 parts of alpha-methyl styrene, 260 parts of styrene and 125 parts of maleic anhydride are admixed with 250 parts of benzene and the mixture heated to 36° C. 6 parts of activated fuller's earth are added in increments of 2 parts over a period of 30 minutes without producing an exothermic reaction. The further addition of 5 parts of the fuller's earth causes an exothermic reaction which raises the temperature to 60° C. over a period of 30 minutes. Thereafter, the mixture is cooled to 33° C. in 90 minutes and another addition of 5 parts of the fuller's earth is made. A slightly exothermic reaction results and the mixture is maintained at 36° C. for 2 hours and then filtered.

The filtrate is subjected to distillation at atmospheric pressure and it is noted when the pot temperature reaches 150° C. the residue is undergoing further polymerization. The distillation is stopped and the mixture allowed to react to a viscous resinous mass. This product formulated into a varnish, as in the case of the product of Example II, yields films which on baking at 135° C. for 30 minutes are of high quality.

Numerous variations may be introduced into the process of preparing the new copolymers of the invention as illustrated by the specific examples. For example, the polymerization temperature may be substantially varied. However, temperatures in excess of 0° C. are usually desirable to avoid an unduly long polymerization cycle. On the other hand, temperatures in excess of 85° C. are to be avoided prior to completion of the exothermic reaction since copolymers prepared at higher temperatures are found to be deficient in reactivity with unsaturated oils. A preferred range is 20–50° C.

Treatment under polymerization conditions is usually continued until there is no further evidence of an exothermic reaction on the addition of fuller's earth. While a shorter reaction period is permissible, unreacted materials may remain and render the process non-economic. Usually 1–5% of fuller's earth based on the amount of monomeric materials is sufficient to complete the exothermic reaction. The fuller's earth may be activated, if desired, by heating, e. g., at 100–500° C. for 1–10 hours in order to promote its catalytic effect.

While the copolymerization may be carried out in the absence of a diluent, improved results are generally attained at least in the final stages by including a solvent for the reacting materials. Usually, 25–100 parts of a solvent for every 100 parts of reactants represent a desirable amount although greater or lesser quantities my be advantageous under certain conditions. In place of benzene, other solvents for the reactants may be used such as toluene, xylene, ethylene dichloride, etc.

It is unexpectedly found that in order to ensure an oil-soluble product, at least 2 mols of alpha-methyl styrene must be present for every mol of maleic anhydride. Larger proportions of alpha-methyl styrene may be used as indicated by the examples, but usually not more than 8 mols of alpha-methyl styrene for every mol of maleic anhydride are employed.

A certain amount of styrene may be copolymerized with the alpha-methyl styrene and maleic anhydride, but the molar proportion of styrene should not exceed the molar proportion of alpha-methyl styrene. According to one embodiment of the invention, the molar proportion of styrene is from 10–50% of the molar proportion of alpha-methyl styrene. Copolymers including styrene as one component are advantageous for the purpose of imparting unique characteristics to the copolymers and varnishes prepared there-from. In addition, somewhat improved yields of copolymer are obtained.

In preparing the copolymers of the invention, it is usually desirable to subject the reaction product to distillation at elevated temperatures and under reduced pressures. This treatment is used in the specific examples and serves to remove any solvent and unreacted materials as well as any low polymers, e. g., the dimer of alpha-methyl styrene, which may be formed.

As shown by the examples, the copolymers of the invention contain ethylenic unsaturation as evidenced by the fact that solutions thereof show a marked absorption of bromine. In addition, the copolymers have rather low molecular weights, i. e., less than 2,000 and, more particularly, less than 1,000, but more than 300.

As shown by the examples, the copolymers of the invention are soluble in unsaturated oils and on heating mixtures of the copolymers and the unsaturated oils, a reaction occurs. Varnishes prepared by incorporating the resins of the invention in drying and semi-drying oils are characterized by many advantageous characteristics including a high degree of water-resistance, resistance to solvents, toughness and durability. For most purposes, from 100 to 500 parts of a drying or semi-drying oil are incorporated in 100 parts of the polymer resins.

Varnishes may be prepared by incorporating the copolymers of the invention in various unsaturated oils, including linseed, perilla, Chinawood, oiticica, soy bean, sunflower, corn, dehydrated castor, cottonseed, etc., as well as mixtures of these and other oils.

A particular characteristic of the copolymers of the invention is their reactivity with alcohols due to the presence of carboxyl groups therein. Thus, prior or subsequent to incorporation in unsaturated oils, the copolymers of the invention may be reacted with mono- or polyhydric alcohols. In certain of the examples, reaction with hydroxy-dihydro-dicyclopentadiene is illustrated. However, other alcohols may be used, for example, such polyhydric alcohols as glycerine, erythritol, pentaerythritol, glycols such as ethylene glycol, diethylene glycol, triethylene glycol, tetraethylene glycol, pentaethylene glycol, propylene glycol, sorbitol, manitol, etc. The resulting mixtures are usually reacted by heating at a temperature of 150 to 250° C.

Examples of monohydric alcohols which may be used include methyl, ethyl, propyl, butyl, amyl, hexyl, heptyl, octyl, nonyl, decyl, lauryl, oleyl, stearyl, and the like. Mixtures of these alcohols may be used as well as mixtures of these and other alcohols such as those mentioned above.

The copolymers of the invention may also be advantageously incorporated in non-drying oils such as castor oil, coconut oil, and the like. Ester interchange with such oils may be effected by reaction with the copolymers or esters thereof in the presence of catalysts such as zinc oxide for hydrolyzing the glycerides.

Partial esters of glycerine and other polyhydric alcohols may be reacted with the copolymers of the invention or partial esters thereof. For example, the glyceride oils mentioned above may be heated with an alcoholysis catalyst, such as zinc oxide, and simultaneously or subsequently reacted with the copolymers of the invention or partial or complete esterification products thereof. When the copolymer is incompletely esterified, additional alcohol, such as glycerine, may be included in the reaction mixture.

The copolymers of the invention as well as partial or complete esterification products thereof may be used to modify alkyd resins, e. g., glyceryl phthalate resins or oil acid-modified alkyd resins, e. g., glycerine-phthalic anhydride-linseed oil acid polyester resins. The copolymers of the invention may be incorporated at a suitable stage of the polyester reaction. Sufficient mono- and/or polyhydric alcohols may be included with the copolymers to correspond to the acidity thereof. For most purposes, 5–50 parts of the copolymers of the invention are incorporated for each 100 parts of alkyd resin. However, larger or smaller amounts may be employed to yield useful products.

The coating compositions of the invention may be formulated in the usual manner with driers, as for example, the naphthenates, resinates and oleates of cobalt, manganese, lead, zinc, etc., or mixtures thereof, pigments and other conventional additives and modifiers.

In preparing esters of the copolymers of the invention, either the half ester or the diester or mixtures thereof may be prepared. An excess of the alcohol, e. g., glycerine or hydroxydihydro-dicyclopentadiene may be used to expedite the esterification, if desired, e. g., a 5–10% excess.

Hydroxy-dihydro-dicyclopentadiene has the formula:

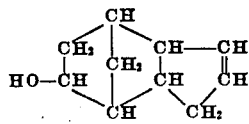

A method for preparing this compound is described in U. S. Patent 2,385,788.

It is obvious that many variations may be made in the products and processes of this invention without departing from the spirit and scope thereof as defined in the appended claims.

What is claimed is:

1. A process for preparing a new copolymer which comprises reacting a mixture of 2–8 molecular proportions of alpha-methyl styrene and 1 molecular proportion of maleic anhydride at a temperature of 0–85° C. in the presence of fuller's earth as a catalyst.

2. A process as defined in claim 1 in which 4 molecular proportions of alpha-methyl styrene are used for each molecular proportion of maleic anhydride.

3. A process as defined in claim 1 in which the temperature is maintained between 20 and 50° C.

4. A process as defined in claim 3 in which successive additions of fuller's earth are made until no exothermic reaction results.

5. A process as defined in claim 1 in which styrene is also present in an amount not exceeding the amount of alpha-methyl styrene on a molar basis.

6. A process as defined in claim 5 in which 100 molecular proportions of alpha-methyl styrene are present for every 10–50 molecular proportions of styrene.

7. An unsaturated oil-soluble copolymer prepared by copolymerizing 2–8 molecular proportions of alpha-methyl styrene with 1 molecular proportion of maleic anhydride in the presence of fuller's earth and at a temperature of 0–85° C.

8. A product as defined in claim 7 in which styrene is also present in a molecular proportion not exceeding that of the alpha-methyl styrene.

9. A coating composition comprising the reaction product of a glyceride oil and an unsaturated copolymer of 2-8 molecular proportions of alpha-methyl styrene with 1 molecular proportion of maleic anhydride made in the presence of fuller's earth at 0–85° C.

10. A product as defined in claim 9 in which the copolymer contains styrene in a molecular proportion not exceeding that of the alpha-methyl styrene.

11. A product as defined in claim 9 in which the glyceride oil is a drying oil.

12. A product as defined in claim 9 in which the glyceride oil is a semi-drying oil.

THEODORE P. MALINOWSKI.

REFERENCES CITED

The following references are of record in the file of this patent:

UNITED STATES PATENTS

| Number | Name | Date |
|---|---|---|
| 2,047,398 | Voss et al. | July 14, 1936 |
| 2,227,808 | Dreisbach | Jan. 7, 1941 |
| 2,320,724 | Gerhardt et al. | June 1, 1943 |
| 2,361,019 | Gerhardt | Oct. 24, 1944 |